US010966132B1

(12) United States Patent
Subramaniam et al.

(10) Patent No.: US 10,966,132 B1
(45) Date of Patent: Mar. 30, 2021

(54) SYSTEM AND METHOD FOR FREQUENCY OBJECT ENABLEMENT IN SELF-ORGANIZING NETWORKS

(71) Applicant: Verizon Patent and Licensing Inc., Arlington, VA (US)

(72) Inventors: Sudha Subramaniam, Westborough, MA (US); Brandon Scott Atkins, Evans, GA (US); Timothy E. Coyle, Chicopee, MA (US); Christian Winter, Highland Village, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/675,505

(22) Filed: Nov. 6, 2019

(51) Int. Cl.
*H04W 36/00* (2009.01)
*H04W 36/18* (2009.01)
*H04W 36/08* (2009.01)
*H04W 48/18* (2009.01)
*H04W 16/10* (2009.01)
*H04W 16/28* (2009.01)
*H04W 74/08* (2009.01)
*H04W 72/04* (2009.01)

(52) U.S. Cl.
CPC .......... *H04W 36/18* (2013.01); *H04W 16/10* (2013.01); *H04W 16/28* (2013.01); *H04W 36/0072* (2013.01); *H04W 36/00835* (2018.08); *H04W 36/08* (2013.01); *H04W 48/18* (2013.01); *H04W 74/0816* (2013.01); *H04W 72/0453* (2013.01)

(58) Field of Classification Search
CPC ..... H04W 36/18; H04W 36/08; H04W 48/18; H04W 36/0072; H04W 36/00835; H04W 16/28; H04W 74/0816; H04W 16/10; H04W 72/0453
USPC ........................................................ 455/442
See application file for complete search history.

(56) References Cited

U.S. PATENT DOCUMENTS

| 8,565,771 | B1 * | 10/2013 | Klein | H04W 36/0083 |
| | | | | 455/437 |
| 8,942,710 | B2 * | 1/2015 | Brisebois | H04W 28/08 |
| | | | | 455/445 |
| 9,854,454 | B2 * | 12/2017 | Shen | H04W 24/02 |
| 9,918,259 | B2 * | 3/2018 | Klein | H04W 36/00835 |

* cited by examiner

*Primary Examiner* — Amancio Gonzalez

(57) ABSTRACT

Systems and methods provide automated generation of neighbor frequency lists for configuration of frequency objects for wireless stations. A computing device selects a target sector carrier of a wireless station of multiple wireless stations in a radio access network and identifies, based on distances from the wireless station, neighboring sector carriers of the target sector carrier. The computing device filters the neighboring sector carriers based on an azimuth of the target sector carrier to form a filtered set of neighboring sector carriers. The computing device calculates a probability of neighboring frequencies for the target sector carrier based on locations of the filtered set of neighboring sector carriers and generates, based on the calculating, a neighbor frequency list for the target sector carrier. The neighbor frequency list is used to configure frequency objects, for the target sector carrier, that ensure seamless handovers within the radio access network.

20 Claims, 9 Drawing Sheets

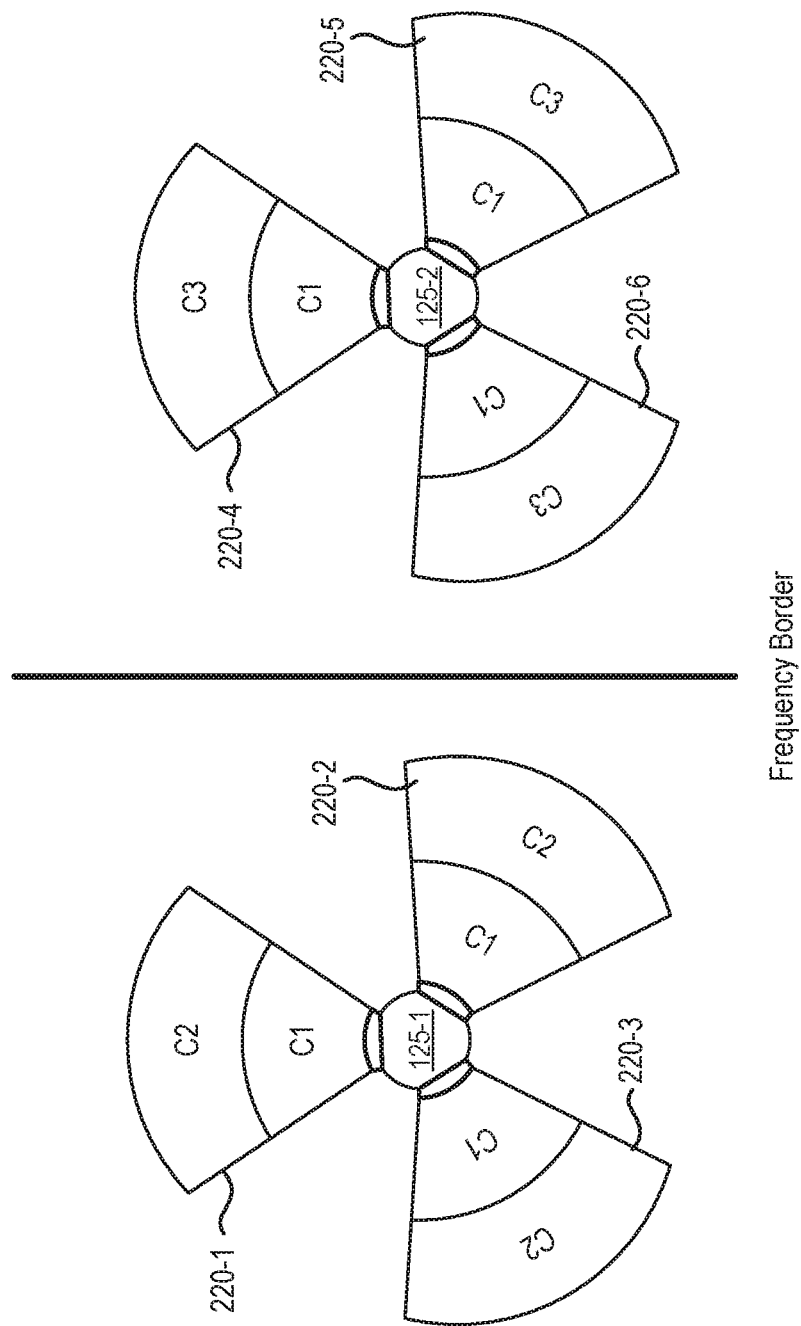

| Morphology | Distance (Heuristic Parameter) |
|---|---|
| Rural | z KM |
| Suburban | y KM |
| Urban | x KM |
| Undetermined | z KM |

| Market ID | WS ID | Sector # | Carrier # | Azimuth | Morphology | Latitude | Longitude | DL Freq. |
|---|---|---|---|---|---|---|---|---|
| 01 | 01001 | 1 | 1 | 30.0 | Suburban | 42.111111 | -71.111111 | 6000 |
| 01 | 01001 | 1 | 2 | 30.0 | Suburban | 42.111111 | -71.111111 | 3100 |
| 01 | 01001 | 2 | 1 | 150.0 | Suburban | 42.111111 | -71.111111 | 6000 |
| 01 | 01001 | 2 | 2 | 150.0 | Suburban | 42.111111 | -71.111111 | 3100 |
| 01 | 01001 | 3 | 1 | 260.0 | Suburban | 42.111111 | -71.111111 | 6000 |
| 01 | 01001 | 3 | 2 | 260.0 | Suburban | 42.111111 | -71.111111 | 3100 |
| 01 | 01003 | 1 | 1 | 0.0 | Rural | 42.222222 | -72.222222 | 6000 |
| 01 | 01003 | 1 | 2 | 120.0 | Rural | 42.222222 | -72.222222 | 6000 |
| 01 | 01003 | 1 | 3 | 240.0 | Rural | 42.222222 | -72.222222 | 6000 |
| 01 | 01006 | 1 | 1 | 0.0 | Undeterm. | 42.333333 | -73.333333 | 6000 |
| 01 | 01006 | 1 | 2 | 0.0 | Rural | 42.333333 | -73.333333 | 3150 |
| 01 | 01006 | 2 | 1 | 120.0 | Undeterm. | 42.333333 | -73.333333 | 6000 |
| 01 | 01006 | 2 | 2 | 120.0 | Rural | 42.333333 | -73.333333 | 3150 |
| 01 | 01006 | 3 | 1 | 240.0 | Undeterm. | 42.333333 | -73.333333 | 6000 |
| 01 | 01006 | 3 | 2 | 240.0 | Undeterm. | 42.333333 | -73.333333 | 3150 |

SYSTEM AND METHOD FOR FREQUENCY OBJECT ENABLEMENT IN SELF-ORGANIZING NETWORKS

BACKGROUND INFORMATION

Providers of wireless communication services continue to improve and expand available wireless networks. One aspect of such improvements includes the development of wireless access networks as well as options to utilize such wireless access networks. A wireless access network may manage a large number of devices. For example, a base station (also referred to as a wireless station) may service a large number of mobile devices, connecting these devices to a core network. The mobile devices may move within the wireless access network, using different base stations to maintain a connection with the core network. During an execution of a handover procedure between wireless stations, various signaling may take place between a source wireless station and a new wireless station, as well as signaling with a mobile device. The success or failure of the handover procedure can impact the quality of service provided to the mobile device.

BRIEF DESCRIPTION OF THE DRAWINGS

FIG. 3C is an illustration of a frequency border according to an implementation;

FIG. 7 is a diagram illustrating exemplary components of the sector database of FIG. 5 according to an implementation described herein.

DETAILED DESCRIPTION OF PREFERRED EMBODIMENTS

Figure 1:
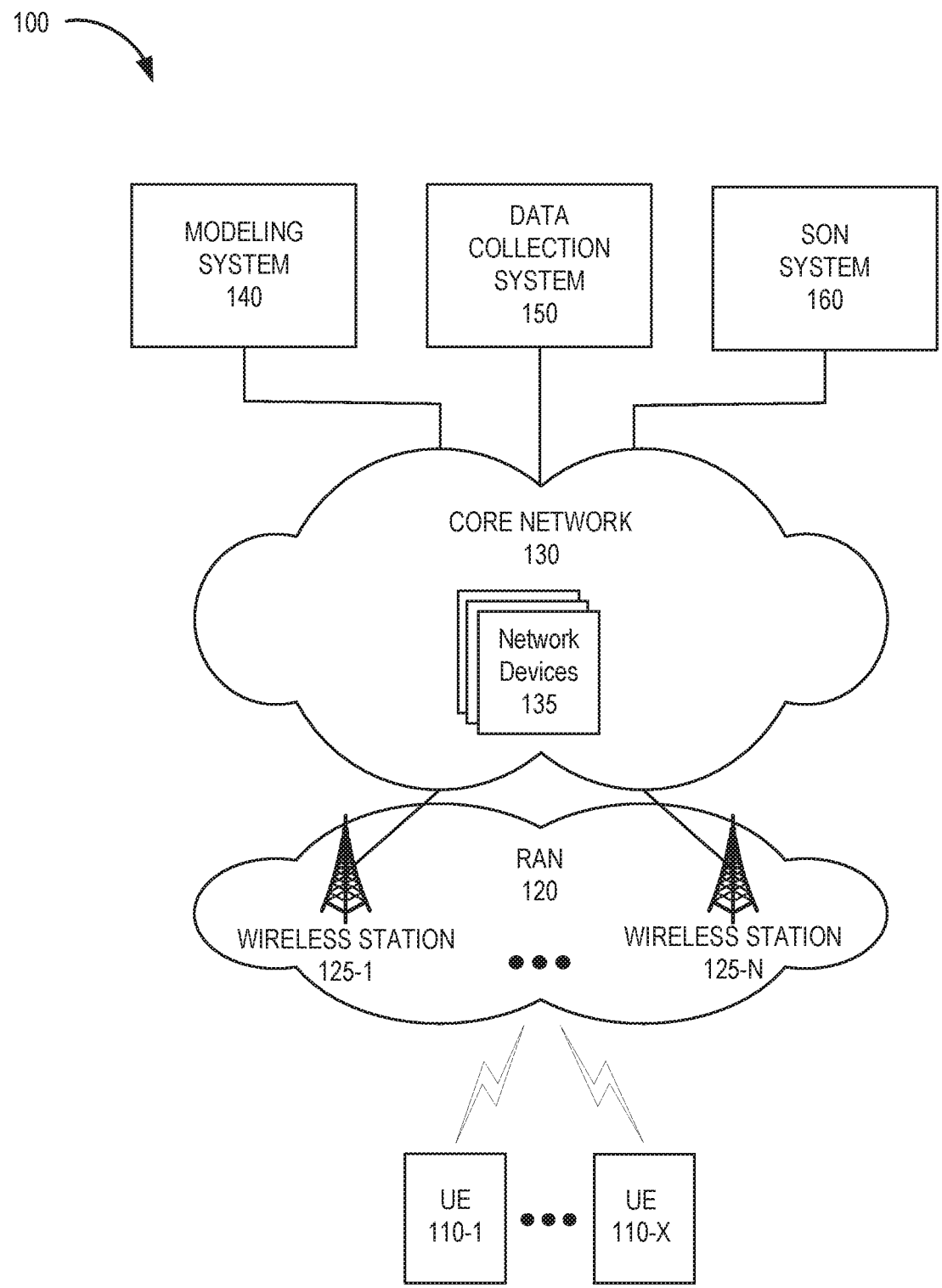
FIG. 1 is a diagram illustrating an environment according to an implementation described herein.

The following detailed description refers to the accompanying drawings. The same reference numbers in different drawings identify the same or similar elements.

A handoff (or handover) refers to the process of transferring an active call or data session from one cell in a cellular network to another or from one channel in a cell to another. A well-implemented handoff is important for delivering uninterrupted service to a voice or data session user.

Each wireless station typically uses multiple carrier frequencies in a single instance. For example, a single wireless station may provide coverage over an area referred to as a cell. A cell typically uses multiple carrier frequencies to meet capacity demands and provide guaranteed service quality within each cell. It is not cost effective to deploy all carrier frequencies on every cell a wireless carrier owns in a particular area. A cell may be divided into one or more sectors, with each sector providing different areas of coverage that may overlap. A particular sector may also transmit and/or receive signals on one or more predefined carrier frequencies. The combination of a sector and a particular carrier frequency may be referred to herein as a "sector carrier."

A wireless station may have thousands of parameter settings (referred to as "managed objects"). The parameters have to be configured correctly to perform a successful handover. One such parameter includes building proper neighbor relations between wireless stations. For example, each wireless station has particular managed objects, referred to as "frequency objects," that indicate the neighbor frequencies to be measured. Mobile devices then use these configured parameter neighbor frequencies to provide Cell Measurement Reports (CMR) for neighboring cells, which are critical in ensuring mobile devices can be handed off to new wireless stations. As described further below, when a handover is performed with unfavorable wireless station configurations, the handover may fail and require a mobile device to re-establish a wireless connection with the wireless network. This impacts service quality and may create unnecessary network congestion.

Configuring frequency objects for wireless stations has typically been a manual and time-consuming process. The manual process is also error prone. Furthermore, frequency object configurations require updating as new wireless station sites and carrier frequencies are installed. Thus, there remains a need for a solution to ensure that each wireless station has the correct frequency objects configured to allow seamless mobility activities to all neighboring cells.

Systems and methods described herein provide automated generation of neighbor frequency lists for configuration of frequency objects for wireless stations. The systems and methods may predict the neighboring frequency objects each sector carrier should have configured based on the transmitting frequencies and configurations of other wireless stations in a geographic vicinity.

The resulting neighbor frequency list is used to enforce that all of the predicted frequency objects have been constructed properly across every sector carrier in the network. The neighbor frequency list may be ingested as part of a self-organizing network (SON) algorithm for frequency object enforcement. Using the SON algorithm, configurations of each sector carrier are reviewed programmatically, and compared to the resulting neighbor frequency lists generated herein. If the sector carriers are misaligned relative to a neighbor frequency, the SON system may modify, create, or remove the sector carriers as necessary. This allows for handoff to happen between all surrounding frequencies. Often times when carriers are added to one sector, the surrounding sites are not updated. Without neighbor frequency configurations, the mobile devices cannot even scan for the adjacent frequencies, which can lead to dropped calls if the frequency configurations are missing, or set incorrectly. When a frequency object enforcement process is engaged, the final set of changes can be automatically executed with a SON Activation Session without the need for human involvement. As new sector carriers are added to the network, or spectrum is changed, the neighbor frequency list will reflect this change and the frequency object enforcement will continue to automatically adjust to ensure the network is properly configured for mobility.

According to an implementation, a computing device selects a target sector carrier of a wireless station in a radio access network and identifies, based on respective distances from the wireless station, neighboring sector carriers of the target sector carrier. The computing device filters the neighboring sector carriers based on an azimuth of the target sector carrier to form a filtered set of neighboring sector carriers. The computing device calculates a probability of neighboring frequencies for the target sector carrier based on locations of the filtered set of neighboring sector carriers and generates, based on the calculating, a neighbor frequency list for the target sector carrier. The computing device provides the resulting neighbor frequency list to a SON system for use in frequency object configuration for the radio access network. The neighbor frequency list is used to configure frequency objects, for the target sector carrier, that ensure seamless handovers within the radio access network FIG. 1 is a diagram of an exemplary environment 100 in which the systems and/or methods, described herein, may be implemented. As shown in FIG. 1, environment 100 may include user equipment (UE) devices 110-1 to 110-X (referred to herein collectively as "UE devices 110" and individually as "UE device 110"), a radio access network (RAN) 120, a core network 130, a modeling system 140, a data collection system 150, and a SON system 160.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a customer premises equipment (CPE) device, such as a set-top box or a digital media player, a WiFi access point, a smart television, etc.; a mobile device; a portable gaming system; global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication.

RAN 120 may enable UE devices 110 to connect to core network 130 for mobile telephone service, text message services, Internet access, cloud computing, and/or other types of data services. RAN 120 may include one or multiple networks of one or multiple types and technologies. For example, RAN 120 may include a Fifth Generation (5G) RAN, a Fourth Generation (4G) RAN, a 4.5G RAN, and/or another type of future generation RAN. By way of further example, RAN 120 may be implemented to include a Next Generation (NG) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN).

RAN 120 may include wireless stations 125-1 to 125-N (referred to herein collectively as "wireless stations 125" and individually as "wireless station 125"). Each wireless station 125 may service a set of UE devices 110. For example, wireless station 125-1 may service some UE devices 110 when the UE devices 110 are located within the geographic area serviced by wireless station 125-1, while other UE devices 110 may be serviced by another wireless station 125 when the UE devices 110 are located within the geographic area serviced by the other wireless station 125.

Depending on the implementation, RAN 120 may include one or multiple types of wireless stations 125. For example, wireless station 125 may include an evolved Node B (eNB), an evolved Long Term Evolution (eLTE) eNB, a next generation Node B (gNB), a radio network controller (RNC), a remote radio head (RRH), a baseband unit (BBU), a small cell node (e.g., a picocell device, a femtocell device, a microcell device, a home eNB, a repeater, etc.), or another type of wireless node. Wireless stations 125 may connect to core network 130 via backhaul links, such as wired or optical links. According to various embodiments, RAN 120 may be implemented according to various wireless technologies (e.g., radio access technology (RAT), etc.), wireless standards, wireless frequencies/bands, and so forth.

In some embodiments, wireless station 125 may include a one or more radio frequency (RF) transceivers facing particular directions. For example, wireless station 125 may include three RF transceivers and each RF transceiver may service a 120-degree sector of a 360-degree field of view. Each RF transceiver may include an antenna array. The antenna array may include an array of controllable antenna elements configured to send and receive RF signals via one or more antenna beams. The antenna elements may be mechanically or digitally controllable to tilt, or adjust the orientation of, an antenna beam in a vertical direction and/or horizontal direction.

Core network 130 may manage communication sessions for UE devices 110. Core network 130 may provide mobility management, session management, authentication, and packet transport, to support UE device 110 and wireless station 125 wireless communications using, for example, a dual connectivity, multi-RAT configuration. Core network 130 may be compatible with known wireless standards which may include, for example, 3GPP 5G, LTE, LTE Advanced, Global System for Mobile Communications (GSM), Universal Mobile Telecommunications System (UMTS), IS-2000, etc. Some or all of core network 130 may be managed by a provider of communication services that also manages RAN 120 and/or UE device 110. Core network 130 may allow the delivery of Internet Protocol (IP) services to UE device 110, and may interface with other external networks. Core network 130 may include one or more server devices and/or network devices, or other types of computation or communication devices (referred to collectively as network devices 135).

Modeling system 140 may include one or more devices, such as computing devices and/or server devices, which perform modeling of sector carrier neighbor frequencies. For example, modeling system 140 may include one or more trained machine learning models to convert wireless station location data into spatial coordinates. Modeling system 140 may further identify distances between wireless stations and morphology categories for each sector carrier to determine potential neighbor carrier frequencies. In some aspects, modeling system 140 may filter the group of potential neighbor carrier frequencies based on sector carrier directions. Modeling system 140 may also generate a neighbor frequency list for each wireless station and sector carrier in RAN 120 or designated portions thereof.

Data collection system 150 may collect and store network data for RAN 120. For example, data collection system 150 may generate records for wireless stations 125 that include location data, configured sectors, and carrier frequencies. According to implementations described herein, data collection system 150 may provide RAN data to modeling system 140 for modeling of sector carrier neighbor frequencies.

SON system 160 may include one or more devices, such as computer devices and/or server devices, which perform part of self-organization functions for access network 120 and/or core network 130. SON system 160 may obtain information relating to wireless stations 125 and may perform SON actions based on the obtained information. For example, SON system 160 may send an instruction to wireless station 125, such as, for example, an instruction to adjust one or more handover parameters, adjust one or more coverage optimization parameters, adjust one or more power distribution parameters, and/or perform another type of adjustment. SON system 160 may receive a recommendation (e.g., a neighbor frequency list for a sector-carrier) from modeling system 140 and may elect to perform the recommended SON adjustment or solicit authorization to perform the recommended SON adjustment. SON system 160 may use neighbor frequency list for frequency object enforcement. SON system may review configurations of each sector carrier and compare the configurations to the neighbor frequency lists. If the sector carriers are misaligned relative to a neighbor frequency, the SON system may modify, create, or remove sector carriers as necessary.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
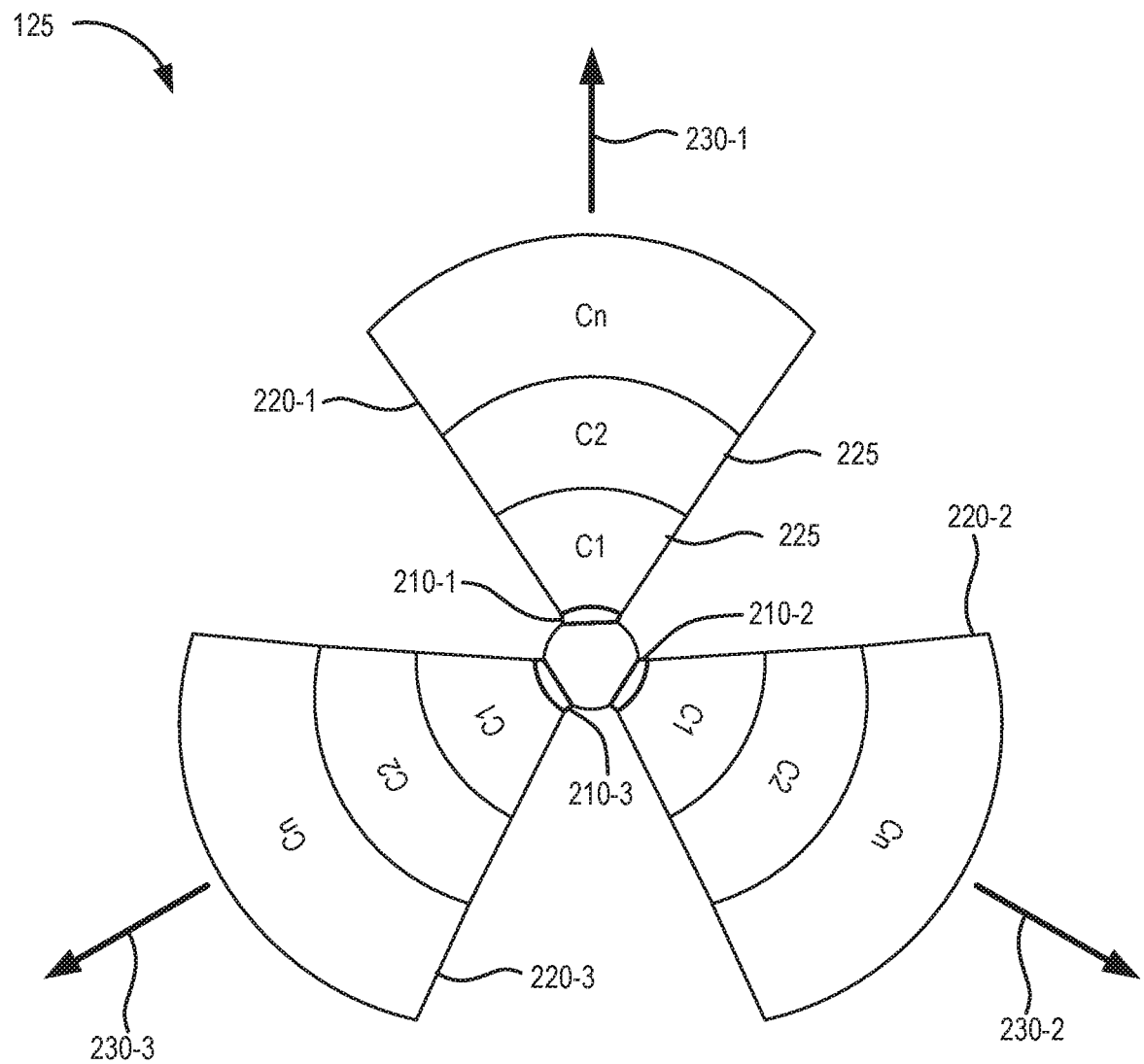
FIG. 2 is a diagram illustrating different sectors and channels for a wireless station of FIG. 1.

FIG. 2 is a schematic top view illustrating different sectors and channels for wireless station 125. As shown in FIG. 2, wireless station 125 may include multiple antenna arrays 210-1, 210-2, and 210-3 (referred to collectively as "antenna arrays 210" and individually as "antenna array 210") covering three corresponding sectors 220-1, 220-2, and 220-3 (referred to collectively as "sectors 220" and individually as "sector 220"). Antenna array 210 may include an array of antenna elements configured to send and receive wireless signals. According to an implementation, the antenna elements may be controllable to tilt or steer an antenna beam in a vertical direction and/or horizontal direction.

Wireless station 125 may use multiple carrier frequencies, referred to C1, C2, . . . , Cn, within each sector 220. In the example of FIG. 2, wireless station 125 may use antenna arrays 210 to serve three 120-degree sectors, where each sector 220 may provide different areas of coverage that may overlap. In other implementations, wireless station 125 may have more or fewer sectors 220. A particular sector 220 may also transmit and/or receive signals on one or more of the predefined carrier frequencies, C1, C2, . . . , Cn. When associated with a particular sector 220, the carrier frequencies may be generally referred to as sector carriers 225.

RF coverage for each sector 220 may be governed by various antenna array 210 parameters, including, for example, signal transmit power, a wireless station 125/antenna array 210 location, antenna array 210 orientation (e.g., antenna heading, elevation, and azimuth), and physical geography. As shown in FIG. 2, the general direction of each sector 220 may be defined by an azimuth 230.

Figure 3A:
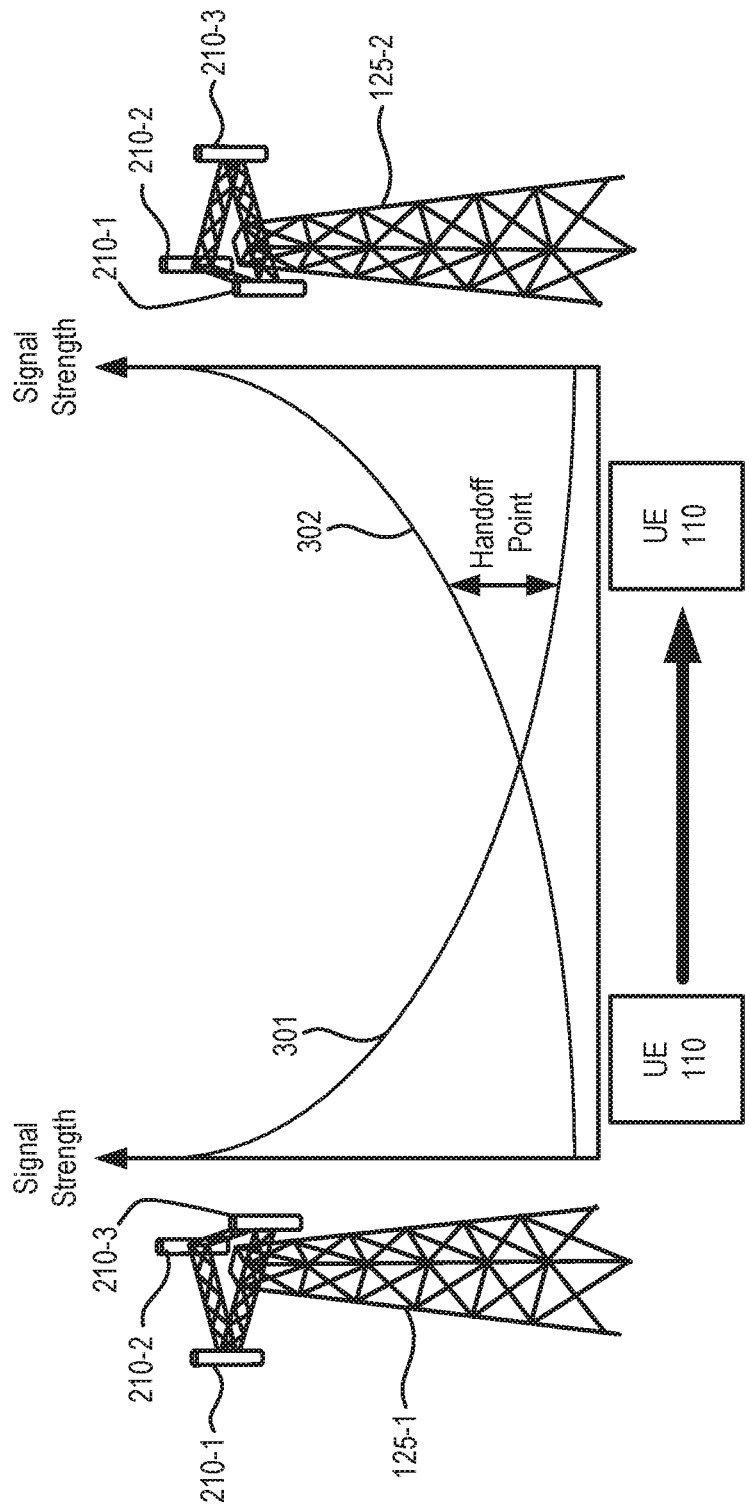
FIG. 3A is a diagram illustrating a wireless handover.

FIG. 3A is a diagram illustrating a wireless handover for UE device 110 between wireless station 125-1 and wireless station 125-2. While in an active connection with wireless station 125-1, UE device 110 may provide Cell Measurement Reports (CMRs) for neighboring cells to facilitate handover to a neighboring wireless station 125-2 (and other wireless stations 125, not shown). As UE device 110 traverses away from wireless station 125-1, signal strength 301 from one of antenna arrays 210 (e.g., 210-3 of wireless station 125-1) will decrease and signal strength 302 from one of antenna arrays 210 (e.g., 210-1 of wireless station 125-2) will increase. Eventually, wireless station 125-1 and wireless station 125-2 agree on a handoff (e.g., when signal strength 302 is established as stronger than signal strength 301) for UE device 110. For UE device 110 to provide CMRs for relevant cells, wireless stations 125 need to be properly configured with correct frequency objects (e.g., neighbor frequencies).

Figure 3B:
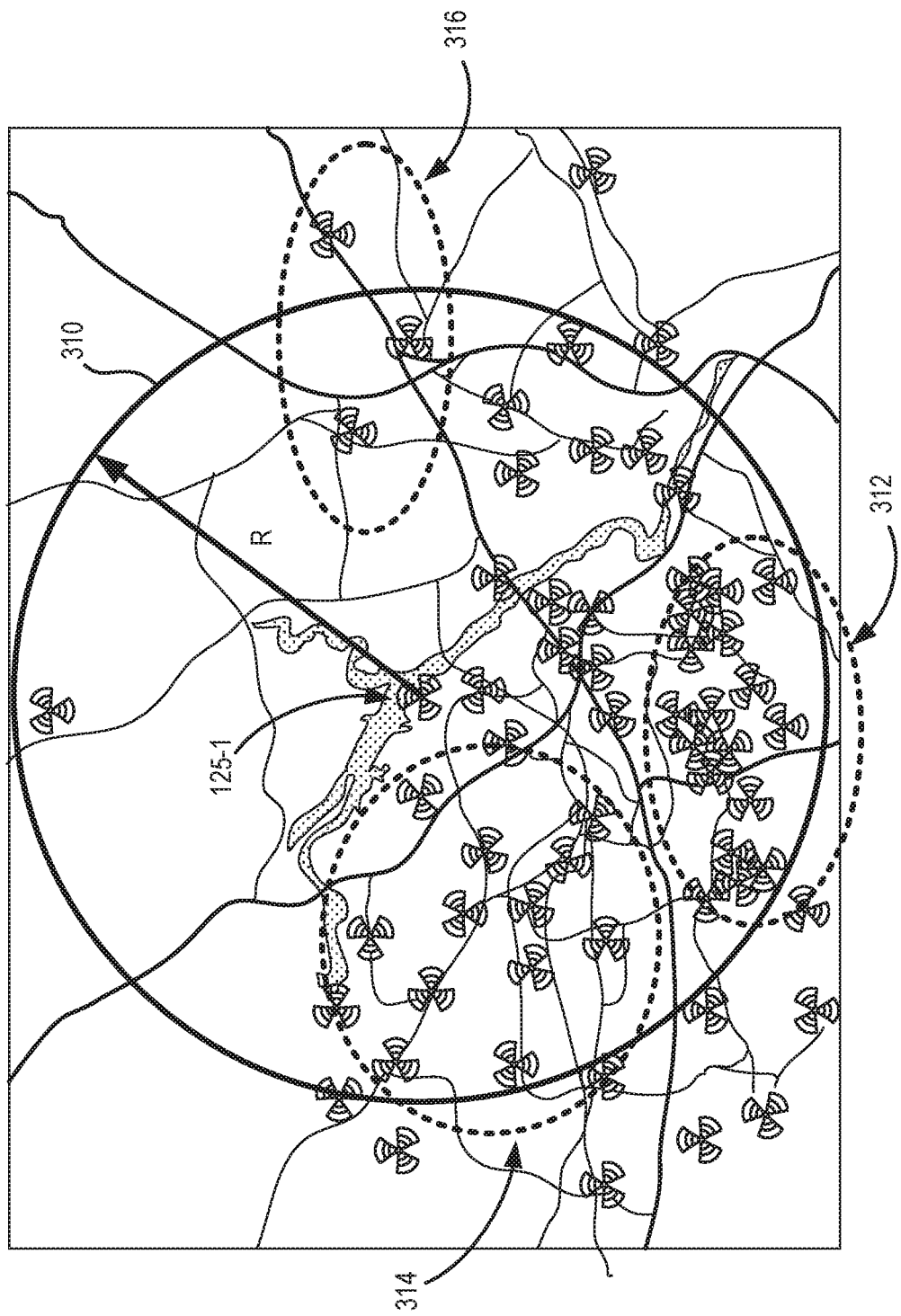
FIG. 3B is a diagram illustrating a geographic environment with different morphologies for wireless stations.

FIG. 3B is a diagram illustrating a geographic environment with different morphologies for wireless stations 125. As shown in FIG. 3B, a wireless station 125-1 may have multiple neighboring wireless stations 125 within an area 310, defined by a radius R, where R may be several kilometers, for example. Within area 310, population and wireless station 125 placement may be reflected in classification of a wireless station 125-1 (or a sector carrier 225 of wireless station 125-1) into one of, for example, three morphologies. A morphology category may generally reflect the cell placement density of a surrounding area. According to an implementation, wireless stations 125 may be classified as urban (e.g., corresponding to dense wireless station placement, such as in area 312), suburban (e.g., corresponding to moderately dense wireless station placement, such as in area 314), or rural (e.g., corresponding to sparse wireless station placement, such as in area 316). According to implementations described herein, each sector carrier 225 of a wireless station 125 may be assigned a morphology category or designated as unclassified. The morphology classification may be applied to give an estimated signal range (e.g., a distance) for each wireless station 125/sector carrier 225. In some implementations, different sector carriers 225 for the same wireless station 125 may have different morphology categories.

FIG. 3C is an illustration of a frequency border for two wireless stations 125-1 and 125-2 according to an implementation. In FIG. 3C, assume wireless station 125-1 has three sectors 220-1, 220-2, and 220-3 that use the same two carrier frequencies, C1 and C2. Further assume wireless station 125-2 has three sectors 220-4, 220-5, and 220-6 that use two carrier frequencies, C1 and C3. C1, C2, and C3 may correspond, for example, to frequencies within a spectrum assigned to a wireless carrier.

In the arrangement of FIG. 3C, sectors 220-1 and 220-2 must consider border frequency C3 to ensure seamless handovers. Conversely, border frequency C3 would not affect sector 220-3. Thus, frequency objects for sectors 220-1 and 220-2 would be configured optimally to solicit CMRs for border frequency C3, while a frequency object for sectors 220-3 could exclude border frequency C3. For wireless station 125-2, sectors 220-4 and 220-6 must consider border frequency C2 to ensure seamless handovers. While border frequency C2 would not affect sector 220-5. Thus, a frequency object for sectors 220-4 and 220-6 should be configured to solicit CMRs for border frequency C2, while a frequency object for sectors 220-5 could exclude border frequency C3.

Figure 4:
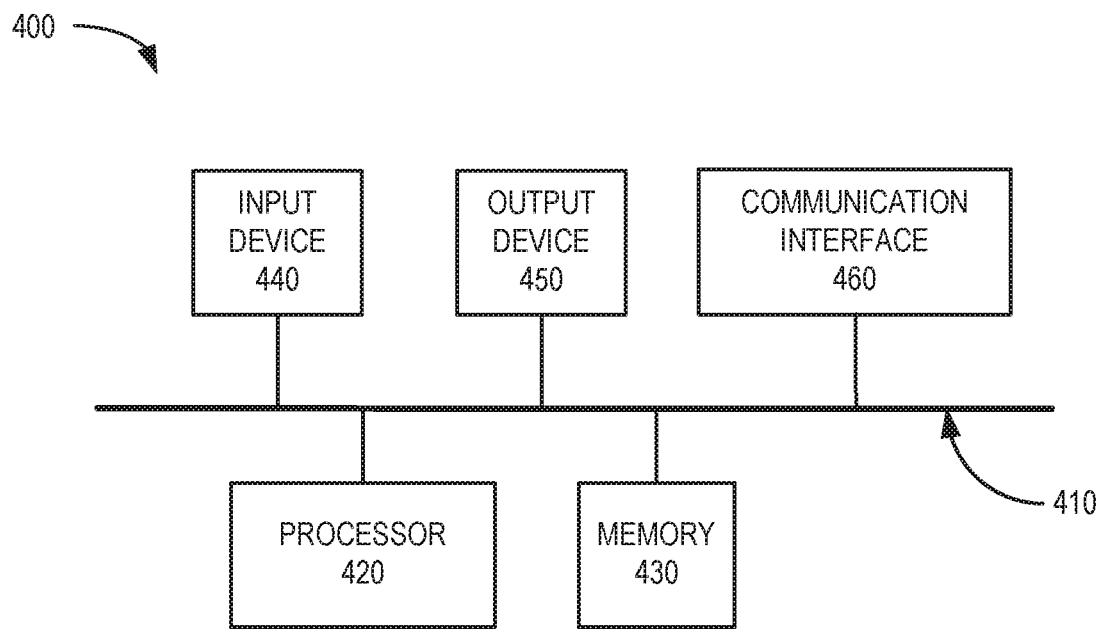
FIG. 4 is a diagram illustrating exemplary components of a device that may be included in a component of FIG. 1 according to an implementation described herein.

FIG. 4 is a diagram illustrating example components of a device 400 according to an implementation described herein. UE device 110, wireless station 125, network devices 135, modeling system 140, data collection system 150, SON system 160, and/or other components of network environment 100 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to implementing closed loop analytics feedback for a transport network. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
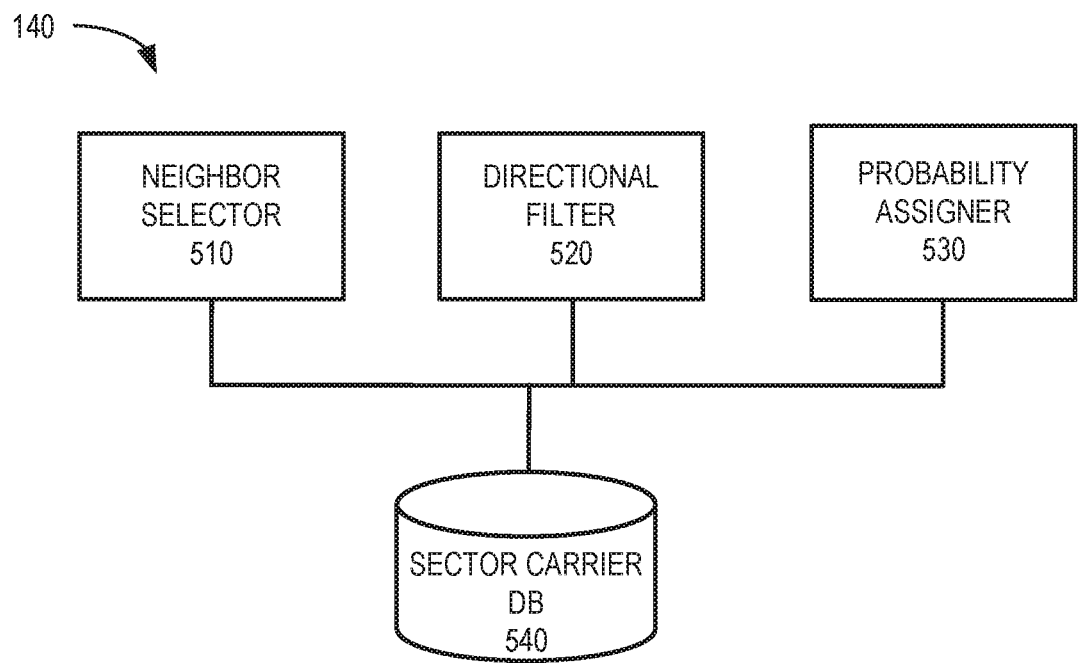
FIG. 5 is a diagram illustrating exemplary components of the modeling system of FIG. 1.

FIG. 5 is a diagram illustrating exemplary logical components of modeling system 140. The components of modeling system 140 may be implemented, for example, via processor 420 executing instructions from memory 430. Alternatively, some or all of the components of modeling system 140 may be implemented via hard-wired circuitry. In some implementations, one or more components of modeling system 140 may include machine learning models, such as, for example, a K-nearest neighbors classifier, a decision tree classifier, a naïve Bayes classifier, a support vector machine (SVM) classifier, tree based (e.g., a random forest) classifier using Euclidian and/or cosine distance methods, and/or another type of classifier. As shown in FIG. 5, modeling system 140 may include a geographical neighbor selector 510, directional filter 520, a probability assigner 530, and a sector carrier database (DB) 540.

Geographical neighbor selector 510 may identify a set of wireless stations 125 that may serve as a potential neighboring wireless station for a target wireless station. Geographical neighbor selector 510 may obtain (e.g., from sector carrier database 540) latitude and longitude coordinates for wireless stations and convert the latitude and longitude coordinates to three-dimensional (3D) Cartesian spatial coordinates. Geographical neighbor selector 510 may also obtain (e.g., from sector carrier database 540) a morphology category for each wireless station or sector. Based on the morphology category of the target wireless station (e.g., a wireless stations 125 for which neighboring frequencies are being determined), geographical neighbor selector 510 may assign a relevant distance to determine a radius for which wireless stations and sector carriers are close enough to the target wireless station to serve as potential neighbors.

According to one implementation, geographical neighbor selector 510 may select up to J nearest neighbors within a radius that is based on the morphology of the target wireless station. Selection of the J closest neighbors may be based on, for example, the Euclidian distance between a target sector carrier and other sector carriers. The value of J may be set by a network technician or otherwise assigned.

Figures 6A, 6B:
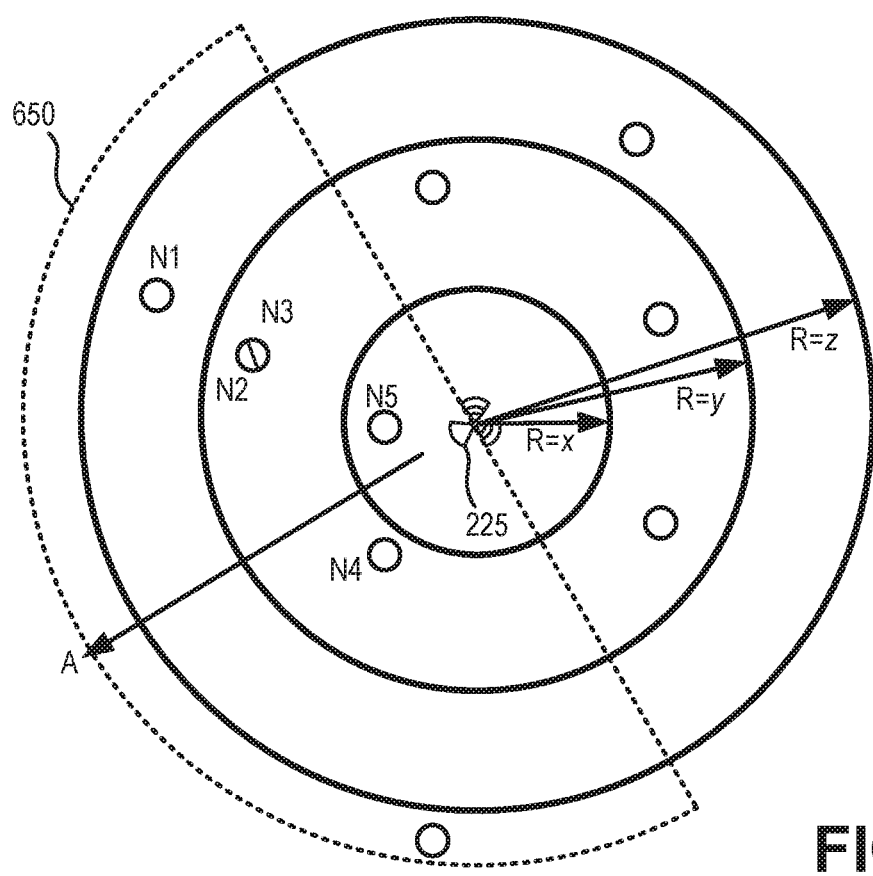
FIG. 6A is a table indicating different morphology categories and distance assignments that can be used by the geographical neighbor selector of FIG. 5.
FIG. 6B is a simplified example of a filter that be applied by the directional filter of FIG. 5.

FIG. 6A is a sample table indicating different morphology categories and distance assignments that may be used by geographical neighbor selector 510. As shown in FIG. 6A, table 600 includes a morphology field 610, a distance field 620, and a variety of entries 630 for fields 610 and 620. Morphology field 610 may represent a geographical condition associated with a wireless station location. Entries 630 for morphology field 610 may include urban (e.g., corresponding to dense wireless station placement, such as in area 312), suburban (e.g., corresponding to moderately dense wireless station placement, such as in area 314), rural (e.g., corresponding to sparse wireless station placement, such as in area 316), and undetermined.

Distance field 620 may provide a corresponding signal range, such as an estimated distance, associated with a morphology type from morphology field 610. Entries 630 in distance field 620 may be derived from heuristics. Each value (e.g., x, y, z) may correspond to a distance (e.g., in kilometers (KM)) of a signal radius for a wireless station. Generally, rural morphology would dictate longer signal ranges than suburban morphology, and suburban morphology would dictate longer signal ranges than urban morphology. Thus, $z>y>x$ in table 600. Wireless stations with undetermined morphology may be assigned a longest distance (e.g., z). Although table 600 includes three defined morphology categories, in other implementations, more categories or sub-categories may be used to define signal radii for wireless stations in different geographic areas.

Returning to FIG. 5, directional filter 520 may apply directional context to filter candidates identified by geographical neighbor selector 510. For example, directional filter 520 may obtain (e.g., from sector carrier database 540) an azimuth indication for a target sector carrier. Using the directional information from the azimuth, directional filter 520 may spatially restrict candidates identified by geographical neighbor selector 510. The spatially restricted area may be equal to or larger than the angle of the target sector 220. For example, directional filter 520 may apply a filter angle over the azimuth that encompasses the scope of the sector angle. As shown in FIG. 6B, for a given sector carrier 225 with an azimuth A and a 120-degree angle, directional filter 520 may spatially restrict sector carrier candidates to a 180-degree filter angle 650 that is bisected by azimuth A. The filtered set of neighbor frequencies identified by directional filter 520 may be a subset K of the J closest neighbors identified by geographical neighbor selector 510.

Probability assigner 530 may assign weights to the filtered group of neighbor frequencies, K, identified by directional filter 520. For each target sector carrier, probability selector 530 may group the K selected neighbors (e.g., as provided by directional filter 520) by carrier frequency. Probability selector 530 may then sort the sector carriers within the same carrier frequency group in order of distance (e.g., distance from the target sector carrier). For each carrier frequency group, probability selector 530 may choose the neighboring sector carrier that is closest to the target sector carrier. Probability selector 530 may then assign a probability for each neighbor carrier frequency based on physical distances of the chosen sector carriers.

According to one implementation, probability selector 530 may assign a weight for each of the neighboring sector carrier frequencies based on its comparative distance to the target sector carrier. For example, if a neighbor distance is 0, the assigned weight may be 1. Otherwise, the weight may be assigned as a distance ratio. As a simplified example illustrated in FIG. 6B, probability assigner 530 may identify the closest five neighboring sector carriers having different frequencies (N1 through N5) of the spatially restricted sector carrier candidates for a target sector carrier 225 with rural morphology (e.g., R=z). Assume each candidate (N) has a distance (d) and frequency (f) as follows: N1(d1, f1); N2(d2, f2); N3(d2, f3); N4(d3, f4); and N5(d4, f5), where $d1>d2>d3>d4$. In this example, the weight assigned to the carrier frequency of N5 may be greater than the weight assigned to the carrier frequency of N4, which may greater than the weight assigned to N3. The weight assigned to N3 may be equal to N2, which may be greater than the weight assigned to N1.

Probability assigner 530 may generate, based on the weighted neighbor frequencies, a neighbor frequency list for the target carrier sector. As described above, the neighbor frequency list may be provided, for example, to SON system 160 for configuration of frequency objects for each sector carrier 225 of wireless stations 125.

Sector carrier database 540 may store information relating to sector carriers associated with wireless stations 125. According to an implementation, data for sector carrier database 540 may be populated by data collection system 150. Sector carrier database 540 may be accessed by geographical neighbor selector 510, directional filter 520, and probability assigner 530 to generate information for frequency objects. Exemplary information that may be stored in sector carrier database 540 is described below with reference to FIG. 7.

FIG. 7 is a diagram illustrating an exemplary data structure of sector carrier database 540, according to an implementation described herein. As shown in FIG. 7, sector carrier database 540 may include one or more wireless station sector records 700. Each wireless station sector record 700 may store information relating to a particular wireless station sector carrier In the example of FIG. 7, each wireless station sector record 700 may include a market ID field 705, a wireless station (WS) ID field 710, a sector number field 715, a carrier number field 720, an azimuth degree field 725, a morphology field 730, a latitude field 735, a longitude field 740, and a downlink (DL) frequency field 745.

Market ID field 705 may indicate a geographic area or region as designated by a mobile carrier or agency regulation. A market ID may, for example, be allocated for certain wireless spectrum. Wireless station ID field 710 may include a unique identifier for a wireless station 125 in record 700. Sector number field 715 may include a sector designation for a sector 220 of the wireless station 125. Carrier number field 720 may include a carrier designation for a carrier used in the corresponding sector 220 of the wireless station 125 in record 700.

Azimuth degree field 725 may include an azimuth direction for the corresponding sector 220 of wireless station 125 in record 700. Morphology field 730 may include a geographic type designation (e.g., Urban, Suburban, Rural, etc.) corresponding to the wireless station 125 in record 700. Latitude field 735 and a longitude field 740 may include latitude and longitude coordinates, respectively, for the corresponding wireless station 125 of record 700. The latitude and longitude coordinates may be converted (e.g., by geographical neighbor selector 510) into spatial distance coordinates. DL frequency field 745 may include a downlink frequency used by the corresponding wireless station 125 of record 700.

Although FIG. 7 shows exemplary fields of sector carrier database 540, in other implementations, sector carrier database 540 may include fewer fields, different fields, or additional fields than depicted in FIG. 7. For example, some fields shown in sector carrier database 540 may be combined or similar information may be represented with different indicators.

Figure 8:
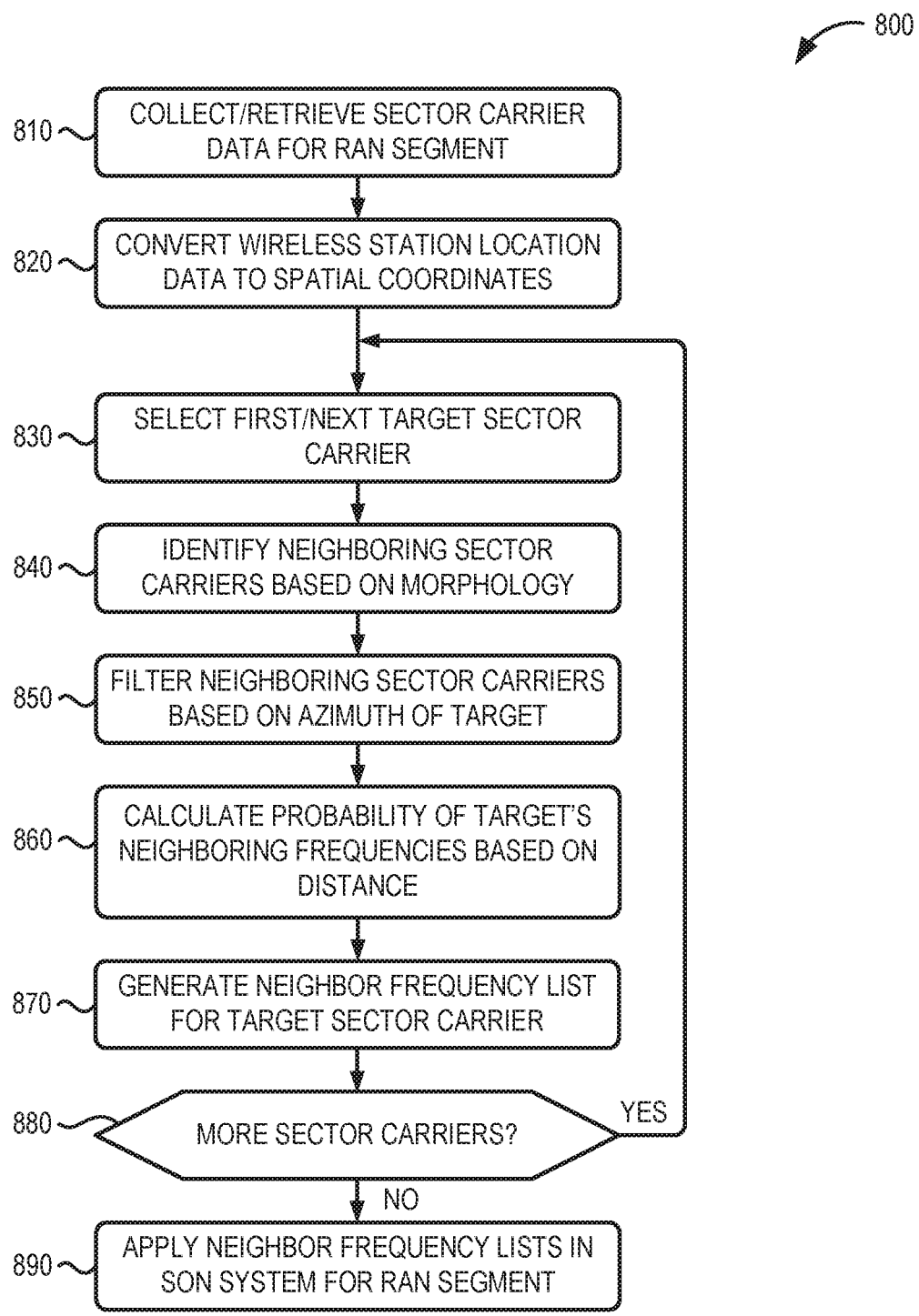
FIG. 8 is a flow diagram illustrating an exemplary process for generating a neighboring frequency list for a target carrier sector, according to an implementation described herein.

FIG. 8 is a flow diagram illustrating an exemplary process 800 for generating a neighboring frequency list for a target carrier sector, according to an implementation described herein. In one implementation, process 800 may be implemented by modeling system 140. In another implementation, process 800 may be implemented by modeling system 140 in conjunction with one or more other network devices in network environment 100.

Process 800 may include collecting or retrieving sector carrier data for a RAN segment (block 810), and converting wireless station location data to spatial coordinates (block 820). For example, modeling system 140 may collect or retrieve wireless station data for all or a portion of wireless stations 125 in RAN 120. Modeling system 140 may store the data in sector carrier database 540, including, for example, wireless station sector records 700. According to an implementation, records 700 may be segmented by market identifiers (e.g., market ID field 705) Geographical neighbor selector 510 may convert some or all of the latitude and longitude coordinates in wireless station sector records 700 to three-dimensional Cartesian spatial coordinates. For example, geographical neighbor selector 510 may convert coordinates for records 700 that have the same market identifier in market ID field 705.

Process 800 may further include selecting a target sector carrier (block 830), and identifying neighboring sector carriers based on morphology (block 840). For example, using a random or ordered sequence, geographical neighbor selector 510 may select one of records 700 as a target sector carrier. Alternatively, a network technician may identify a wireless station or sector carrier, and geographical neighbor selector 510 may select the corresponding record 700. Geographical neighbor selector 510 may identify from sector carrier records 700 a morphology category (e.g., from morphology field 730) for each wireless station or sector in the RAN segment. Based on the morphology category, geographical neighbor selector 510 may assign a relevant signal range (or distance) to each sector carrier to determine which wireless stations are close enough to potentially serve as neighboring wireless stations to the target sector carrier.

Process 800 may also include filtering neighboring sector carriers based on an azimuth of the target sector carrier (block 850). For example, directional filter 520 may obtain (e.g., from sector carrier database 540) an azimuth indication for the target sector carrier. Using the azimuth, directional filter 520 may spatially restrict the neighbor sector carrier candidates identified by geographical neighbor selector 510. For example, for a 120-degree sector 220, directional filter 520 may filter out neighbor sector carriers outside a 180-degree area that is orthogonal to the azimuth.

Process 800 may additionally include calculating probabilities of the target sector carrier's neighboring frequencies based on distance (block 860), and generating a neighbor frequency list for the target sector carrier (block 870). For example, probability selector 530 may choose the nearest sector carriers from each group of sector carriers having the same frequency. Probability selector 530 may then assign a weight for each neighbor carrier frequency based on physical distances of the chosen sector carriers. Probability assigner 530 may generate, based on the weighted neighbor frequencies, a neighbor frequency list for the target carrier sector. The neighbor frequency list may be provided, for example, to SON system 160.

Process 800 may determine if there are more target sector carriers in the RAN segment (block 880). If so (block 880—Yes), process 800 may return to block 830 to select a next target sector carrier. If there are no more target sector carriers in the RAN segment (block 880—No), process 800 may include applying the neighbor frequency lists in a SON system for the RAN segment (block 890). For example, modeling system 140 (e.g., probability assigner 530) may provide to SON system 160 neighbor frequency lists for each sector carrier 225 in all or a portion of wireless stations 125 in RAN 120. SON system 160 may compare the neighbor frequency lists against each sector carrier to configure the frequency objects that indicate neighbor frequencies to be measured for each sector carrier 225. SON system 160 may adjust sector carrier configurations to ensure all neighbor frequencies are accounted for at each sector carrier 225. SON system 160 may use a frequency object enforcement procedure to execute a final set of changes in RAN 120

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 420) of a device. A non-transitory storage medium includes one or more of the storage mediums described in relation to memory 430.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   selecting, by a computing device, a target sector carrier of a wireless station of multiple wireless stations in a radio access network;
   identifying, by the computing device and based on distances from the wireless station, neighboring sector carriers of the target sector carrier;
   filtering, by the computing device, the neighboring sector carriers based on an azimuth of the target sector carrier to form a filtered set of neighboring sector carriers;
   calculating, by the computing device, a probability of neighboring frequencies for the target sector carrier based on locations of the filtered set of neighboring sector carriers;
   generating, by the computing device and based on the calculating, a neighbor frequency list for the target sector carrier; and
   configuring, based on the neighbor frequency lists, frequency objects for the target sector carrier.

2. The method of claim 1, further comprising:
   retrieving, by a computing device, device data for the multiple wireless stations, wherein the device data includes location data, a sector azimuth, and a carrier frequency for each sector carrier of each wireless station of the multiple wireless stations.

3. The method of claim 2, wherein the location data comprises latitude and longitude coordinates, and wherein the method further comprises:
   converting, by the computing device, the location data for each of the wireless stations into spatial coordinates.

4. The method of claim 1, wherein the neighboring sector carriers are identified based on a distance between wireless stations and a morphology category of the target sector carrier.

5. The method of claim 4, wherein the morphology classification corresponds to a signal range.

6. The method of claim 5, wherein the signal range is heuristically determined.

7. The method of claim 1, wherein filtering the neighboring sector carriers comprises:
   identifying the azimuth and a sector angle of the target sector carrier;
   applying a filter angle that encompasses the scope of the sector angle;
   selecting wireless stations, for the neighboring sector carriers, that are within the filter angle; and
   identifying, from the selected wireless stations, the set of neighboring sector carriers.

8. The method of claim 1, wherein calculating the probability of neighboring frequencies for the target sector carrier comprises:
   grouping the set of neighboring sector carriers into common frequency groups,
   choosing, from each of the common frequency groups, the nearest neighboring sector carrier, and
   assigning a weight to each different neighboring frequency based on relative distance of the nearest neighboring sector carriers to the target sector carrier.

9. The method of claim 1, wherein the multiple wireless stations include one or more of an evolved Node B (eNB) and a next generation Node B (gNB).

10. The method of claim 1, wherein the neighboring sector carriers are identified based on an estimated signal range of each sector carrier of the multiple wireless stations.

11. A computing device, comprising:
    a memory storing instructions; and
    a processor, coupled to the memory, configured to execute the instructions to:
    select a target sector carrier of a wireless station of multiple wireless stations in a radio access network;
    identify, based on distances from the wireless station, neighboring sector carriers of the target sector carrier;
    filter the neighboring sector carriers based on an azimuth of the target sector carrier to form a filtered set of neighboring sector carriers;
    calculate a probability of neighboring frequencies for the target sector carrier based on locations of the filtered set of neighboring sector carriers;
    generate, based on the calculating, a neighbor frequency list for the target sector carrier; and configure, based on the neighbor frequency lists, frequency objects for the target sector carrier.

12. The computing device of claim 11, wherein the processor is further configured to execute the instructions to:
retrieve device data for the multiple wireless stations, wherein the device data includes location data, a sector azimuth, and a carrier frequency for each sector carrier of each wireless station of the multiple wireless stations.

13. The computing device of claim 12, wherein the location data comprises latitude and longitude coordinates, and wherein the processor is further configured to execute the instructions to:
convert the location data for each of the wireless stations into spatial coordinates.

14. The computing device of claim 11, wherein the neighboring sector carriers are identified based on a distance between wireless stations and a morphology category of each sector carrier of the multiple wireless stations.

15. The computing device of claim 11, wherein, when filtering the neighboring sector carriers, the processors is further configured to execute the instructions to:
identify the azimuth of the target sector carrier;
select wireless stations, for the neighboring sector carriers, that are within a filter angle that is at least equal to a sector angle of the target sector carrier; and
identify, from the selected wireless stations, the set of neighboring sector carriers.

16. The computing device of claim 11, wherein, when calculating the probability of neighboring frequencies, the processor is further configured to execute the instructions to:
determine a distance between wireless stations for the target sector carrier and each one of the neighboring sector carriers,
choose a nearest neighboring sector carriers for each different neighboring frequency; and
assign a weight to each different neighboring frequency based on relative distance of the chosen neighboring sector carriers to the target sector carrier.

17. The computing device of claim 16, wherein the multiple wireless stations include an evolved Node B (eNB).

18. A non-transitory computer-readable medium storing instructions executable by one or more processors, the instructions comprising:
selecting a target sector carrier of a wireless station of multiple wireless stations in a radio access network;
identifying, based on distances from the wireless station, neighboring sector carriers of the target sector carrier;
filtering the neighboring sector carriers based on an azimuth of the target sector carrier to form a filtered set of neighboring sector carriers;
calculating a probability of neighboring frequencies for the target sector carrier based on locations of the filtered set of neighboring sector carriers;
generating based on the calculating, a neighbor frequency list for the target sector carrier; and
configure, based on the neighbor frequency lists, frequency objects for the target sector carrier.

19. The non-transitory computer-readable medium of claim 18, the instructions thither comprising:
storing device data for the multiple wireless stations, wherein the device data includes location data, a morphology category, a sector azimuth, and a carrier frequency for each sector carrier of each wireless station of the multiple wireless stations.

20. The non-transitory computer-readable medium of claim 18, the instructions further comprising:
converting the location data for each of the wireless stations into spatial coordinates.

* * * * *